March 3, 1964 C. SIELING 3,123,148
BASCULE OR TILTING BEAM PLOW
Filed May 2, 1961 4 Sheets-Sheet 1
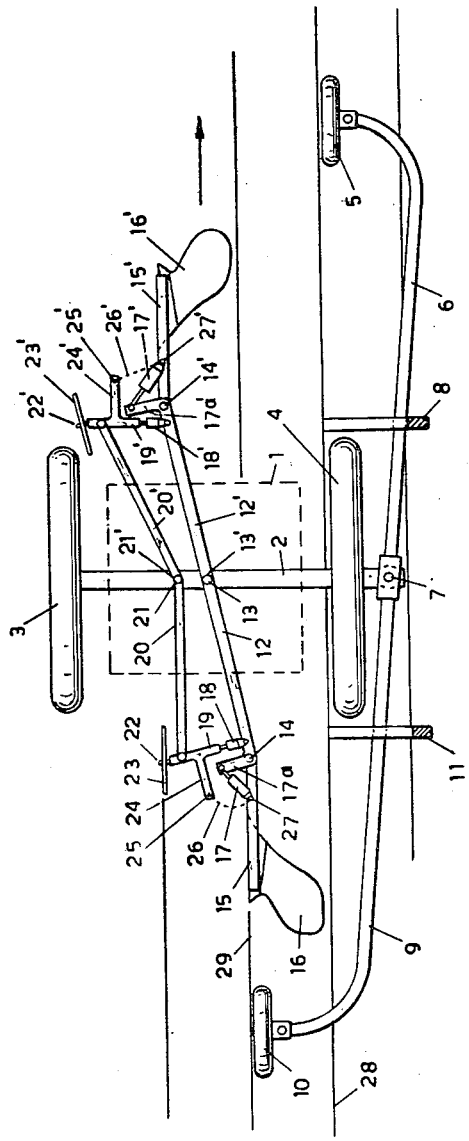
INVENTOR
CORNELIS SIELING
BY
ATTORNEYS

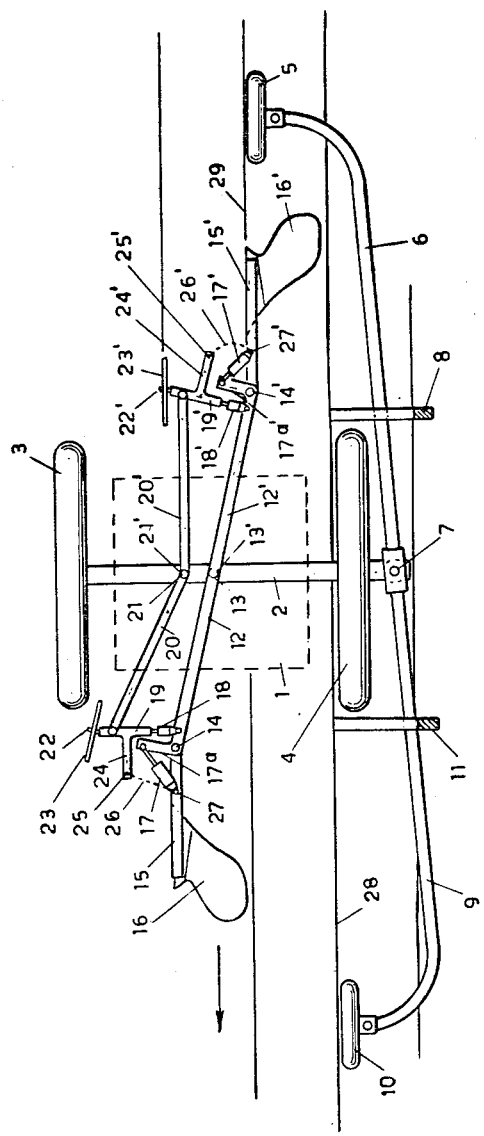

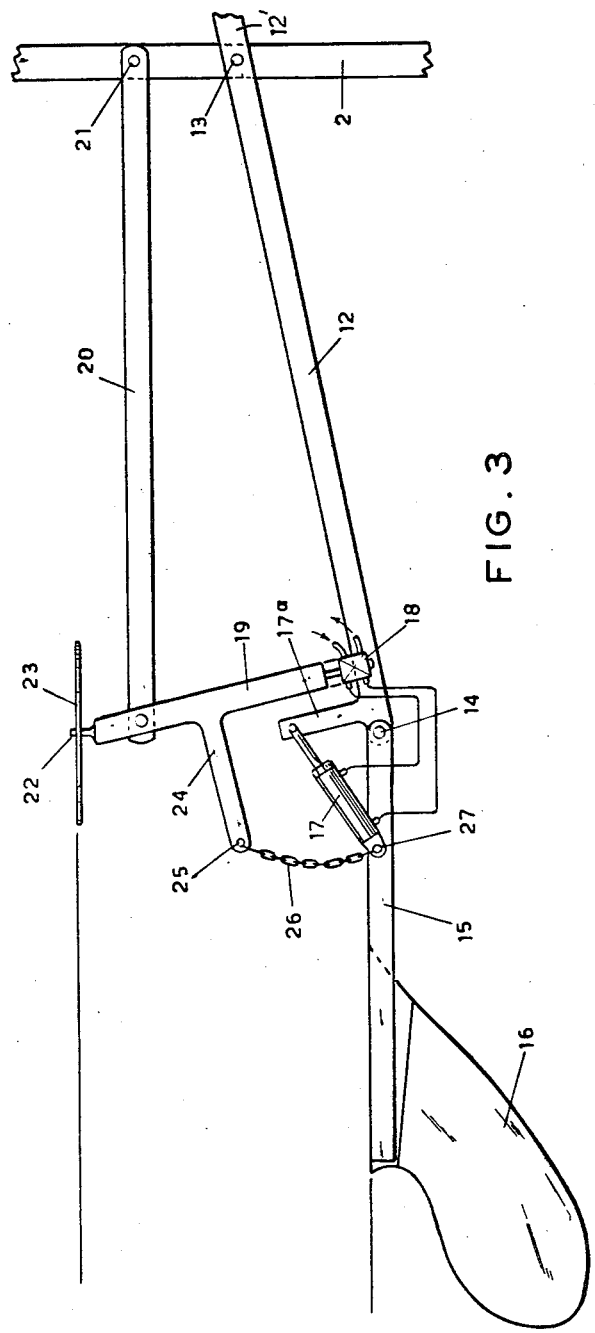

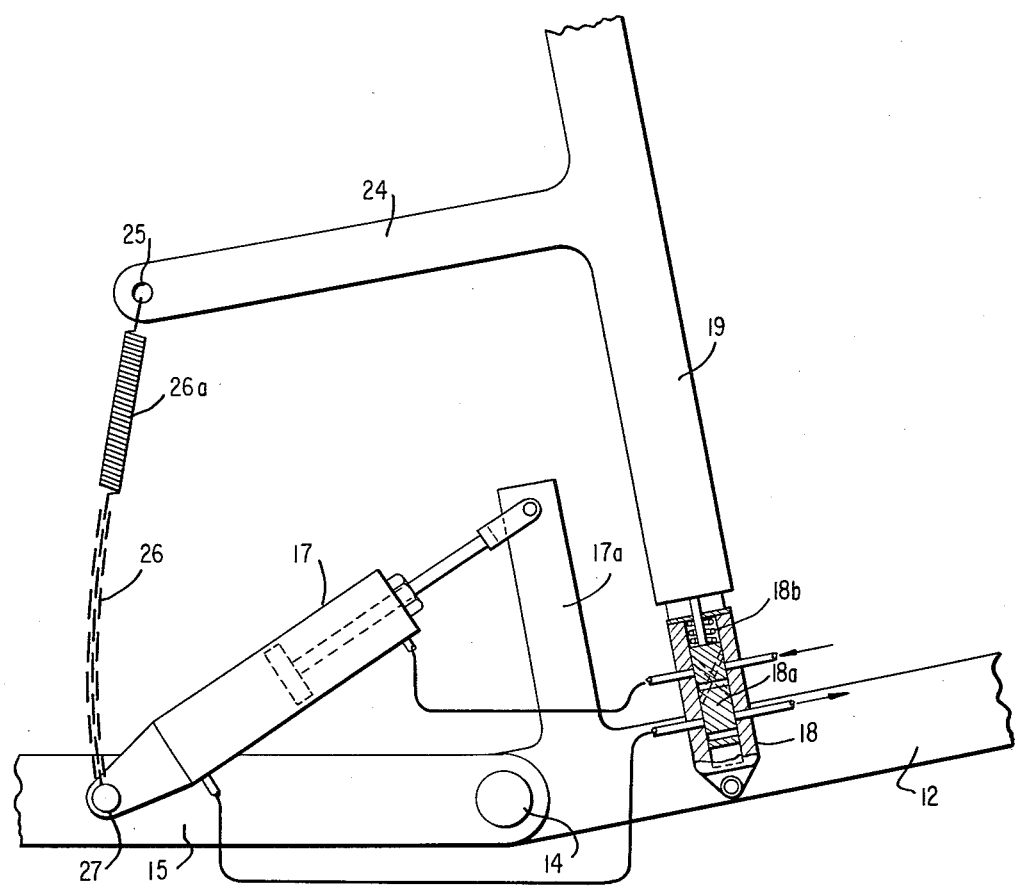

3,123,148
BASCULE OR TILTING BEAM PLOW
Cornelis Sieling, Melissant, Netherlands
Filed May 2, 1961, Ser. No. 107,164
Claims priority, application Netherlands May 3, 1960
11 Claims. (Cl. 172—26)

The invention relates to an automatic bascule or tilting beam plow wherein a movable chassis has at the front and at the rear end one or more alternately operative plow bottoms, and the plow is provided with a separate drive means, which plow is constructed in such a manner that it tends to move off the furrow already plowed, and this deflection is controlled by a wheel guided in the furrow plowed last, means being provided which reverse the direction of driving the plow when reaching the end of the furrow plowed.

The invention has the object of providing a plow of this type which moves on a straight line independently of how heavy the soil is, even with varying reactions acting on the plow bottom, and which does not transmit curvatures, which might have occurred in a furrow, through the guiding wheel to the subsequent furrows but exerts a correcting effect on them. According to the invention the displacement is restrained by a guide wheel, which lies in the direction of movement of the plow and is freely movable in the vertical direction relative to the chassis of the plow and each plow bottom at the forward and rear end of the plow is carried by an arm, which is articulated to a plow beam pivotally mounted on the plow chassis, a servo-motor being provided for adjusting the position of the arm relative to the beam which servo-motor is controlled by the aid of a valve- or slide-device, which device is actuated by means of a rod connected to it which with its free end is adjustably attached to a second beam, which is likewise pivotally mounted on the plow chassis and extends in the longitudinal direction of the plow at a certain distance by the side of the plow beam and at its free end is provided with a rotatably mounted vertical disc in such a manner that the plow bottom follows up the lateral deflections of the disc.

The rotatable disc is unaffected by the varying conditions of the soil, and when the plow describes a straight line, will follow this path. Owing to the servo-motor no transverse forces due to the reaction on the plow can act on the connecting rod and on the disc. When the plow tends to deviate with respect to the disc, the valve- or slide-device is actuated, whereby the position of the plow arm is slightly altered and the reaction of the plow is made such that the valve- or slide-device is returned to the middle or neutral position.

Owing to the fact that the disc is moved on an articulated arm at a certain distance behind the plow, when the plow describes a curved path the disc will describe a path flattened as compared with that of the plow so that any deviation in the guiding furrow has the effect that a subsequent furrow is plowed less deviating.

According to the invention the distance on the plow chassis between the points of articulation of the plow beam and of the second beam may be smaller than the length of the rod between the valve- or slide-device and the free end of the second beam, and the rotatable disc may be journalled on a pivot fixedly connected to the rod. Thereby it is attained, that as soon as a deviation occurs in the position of the plow, also the position of the disc is altered, but less than that of the plow. Thereby an additional favourable effect is attained. The pivot can then include an angle with the centre line of the rod, so that the disc runs at the right spot with respect to the plow chassis.

Moreover, the part of the plow beam lying between the chassis and the rod may be shorter than the corresponding part of the second beam.

The various beams and the like may according to the invention have such a length that the plane of the disc at the normal rectilinear movements of the plow, and the plane of this disc when the plow has performed a small angular deflection, intersect one another on a line which lies at the level of the guide wheel lying at the other end of the plow. The arrangement is then so that the disc may be assumed to be journalled on a beam, which is articulated to the plow on the said line as the hinge line.

In a preferred embodiment the forward and the rear beam of the plow are coupled to one another. Thereby it is attained that the non-operative plow beam is already brought by the operative plow beam into a position, which may serve as a starting position for the next operation to be carried out by the aid of these plow beams.

In order that at the end of a plowed furrow the non-operative plow bottom is already brought into the correct position, according to the invention the valve- or slide-device is under spring bias so that when the rotatable disc lying higher than the plow share is clear of the ground, the servo-motor forces the arm with the plow bottom in the direction away from the disc; this arm is connected by means of a chain or a wire directly or through a connecting rod to the beam carrying the disc, which chain or wire limits the displacement of the arm in such a manner that when one of the plow bottoms has finished plowing, the other plow bottom which is freely suspended at this moment is located above the furrow newly to be plowed, owing to the coupling of the two plow beams, and the plow bottom stands at a position inclined to the longitudinal axis of the plow chassis in such a manner that upon the lateral displacement of the plow according to the new path the plow bottom and the plow beam perform a corresponding adjustment relative to the chassis in the opposite lateral direction in such a maner that the plow bottom comes accurately into the furrow to be plowed, the disc reaching the soil, when the plow has come into the new position.

Owing to the measures described hereinabove even the beginning of a new furrow runs already almost straight, and the plow beam adjusts itself relative to the plow under the effect of the reaction of the soil. As soon as the disc reaches the soil it takes over the guiding, and the chain hangs down slack again.

In a simplified embodiment the plow beam at one end of the plow forms the extension of another beam at the other end of the plow.

By the aid of the chain moreover a second correction has been made possible; when the end of the furrow serving as a guide has a certain curvature, the operative plow bottom will perform an additional adjustment relative to the plow chassis during the last part of the movement. In order to let the next furrow begin at the correct spot, the non-operative plow bottom has accordingly to undergo an additional correction so that it starts plowing on the right spot in spite of the deviation which had occurred. According to the invention for this purpose the end of the chain or wire connected to the plow is connected to the beam carrying the disc at such a point that, depending on whether the non-operative plow beam is swung further away from the furrow, the chain permits the plow arm to adjust itself relative to the plow beam further in the direction away from the disc. Thereby an additional soil reaction is applied to the plow bottom in order to bring the plow beam into the correct position with respect to the plow.

The invention is explained in more detail in the following description of an embodiment given by way of example with reference to the accompanying drawing, in which:

FIGURE 1 is a diagrammatic plan view of the plow according to the invention;

FIGURE 2 is a plan view of the plow when the same has reversed its direction and has arrived in the new position;

FIGURE 3 shows on a larger scale the linkage serving for steering the plow bottom; and FIGURE 4 is a diagrammatic plan view on an enlarged scale showing the slide valve in section connected to the servo-motor for control thereof.

The plow consists of an engine portion 1 preferably mounted in a frame, not shown, above a transverse beam 2 of the plow chassis so that the beams 12 and 20 may swing freely below the engine, the plow being moved by the aid of two driven wheels 3 and 4. The drive to the wheels may be any conventional reversible gear or hydraulic drive and forms no part of this invention. Such drive is automatically reversed at the end of each furrow by known means as for example described in U.S. Patent 1,601,944, issued October 5, 1926, avoiding the need for an operator seated in the plow, the operation being entirely automatic once the plow is started. The wheel 4 has a slightly larger diameter than the wheel 3, so that the plow, when moving to the right in the drawing, tends to deviate towards the left. This tendency is counteracted by a guide wheel 5 which is mounted on an arm 6 articulated at 7 to the plow chassis. An abutment 8 belongs to the plow chassis so that the plow abuts the arm 6 by means of the abutment 8, and consequently follows the path, which is determined by the guide wheel 5. On the point 7 at the same time an arm 9 with a guide wheel 10 is articulated. This arm can rest on an abutment 11. In FIGURE 1 the plow moves to the right. The plow beam 12 is articulated at 13 to the beam 2. At the free end of the beam 12 an arm 15 is attached at 14. This arm 15 carries the plow bottom, or share 16. By the aid of a servo-motor 17, which bears at one side on the arm 15 and at the other side on an arm 17a projecting at a right angle from the beam 12, the position of the arm 15 relative to the arm 12 can be adjusted. The servo-motor 17 is actuated by means of a valve- or slide-device 18 which is a conventional reversing slide valve with a neutral position such as is diagrammatically shown in FIG. 4 mounted on the beam 12. The valve or slide 18a of this device 18 is connected by means of a rod 19 to a beam 20, which is in turn articulated at 21 to the beam 2. The rod 19 carries at its free end a pin 22, which includes an angle with the rod 19 and on which a disc 23 is journalled freely rotatable. The rod 19 has an arm 24 projecting from it in the direction transverse to it, the free end 25 of which is connected to the arm 15 at 27 by means of the chain 26. The plow as a whole with the plow bottom 16, linkage and disc 23 can tip in the vertical direction about the horizontal wheel axis. Thereby either the forward plow bottom or the rear plow bottom may be brought into contact with the soil. On the other side of the beam 2 there lies a corresponding linkage with a plow bottom 16', which is attached to an arm 15' and is articulated at 14' to an arm 12'.

The arm 12' forms the extension of the arm 12. The remaining components associated with the plow bottom 16' are denoted by corresponding numerals as in the left hand part of the FIGURE 1 but are primed. When the plow bottom 16 is in the plowing position, the plow bottom 16' is suspended freely in the air, and vice versa. When the plow in the position as illustrated in FIGURE 1 moves to the right, the tendency of the plow of moving away from the last furrow plowed but one, 28, is opposed by the arm 6 with the guide wheel 5. This guide wheel 5 runs along the straight flank of the furrow 28 and the plow chassis rests on the arm 6 by means of an abutment 8 fixed thereon. The furrow 29, which is being made by the plow bottom 16, accordingly lies by the side of the furrow 28 at a certain spacing from it. The disc 23 cuts through the soil and follows the plow on a definite path. The disc 23 will adjust itself so that its plane lies in the direction of movement of the plow.

When owing to a change in the soil conditions the plowing reaction on the plow bottom 16 changes, the plow bottom could assume a different position relative to the plow whereby a deviation of the plowed furrow would be created. This is prevented by the disc 23 and the manner in which the same is coupled to the beam 12. When the plow bottom shows a tendency for deviation, the valve- or slide-device 18 is actuated by movement from its neutral position. Thereby the servo-motor 17 is adjusted, and the arm 15 assumes a different position relative to the beam 12. The plowing reaction is changed at the same time, and by the soil an oppositely directed lateral force is applied to the plow bottom 16 and accordingly also to the beam 12, whereby the initial tendency of the plow bottom to deviate is abolished. It is accordingly as if the plow beam 12 were rigidly connected to the disc 23, since the distance from the disc 23 remains constant. This is attained by reversal of the fluid flow to the servo-motor as the plow bottom moves in one lateral direction or the other without a force being applied to the rod 19. The disc 23 is therefore not appreciably acted upon by the rod 19 in the lateral direction and will therefore always keep the same direction irrespective of how heavy the soil is.

When owing to any reason a curvature should have arisen in the furrow 28, a correcting effect is set up by the arrangement used when making the furrow 29. Owing to the furrow 28 having a curvature the plow will leave the straight path and will likewise describe a curved path. When the beam 2 changes direction, the quadrilateral formed by the beam 2, beam 12, beam 20 and rod 19 is deformed, and the disc 23 will adjust itself to a position slightly inclined to the position previously assumed by it. One may then imagine that the disc 23 is pivotally mounted at the end of a beam, which is attached to the plow chassis at some distance from the plow, e.g. at the level of the guide wheel 5. When the plow then follows a certain curvature the disc 23 will describe a flattened curved path. By the servomotor the plow bottom 16 is made to follow this path parallel to the disc 23, without any force being applied to the disc as a consequence of the plowing reaction. When the plow has then been moved to-fro several times, the curvature in the following furrow will be smaller than in the preceding furrow, so that after a short while straight plowing is restored again.

Owing to the fact that the plow is tiltable about the drive axle, the plow bottom 16' and the disc 23' will be freely suspended in the air, as mentioned already hereinabove, while the plow bottom 16 and the disc 23 are in operation at the other end of the plow. The valve- or slide-device 18' is under spring bias of element 18b so that when no external forces are applied to the plow bottom 16' and the disc 23', the servo-motor 17' is so actuated that the same tends to move into an extreme position. This movement towards an extreme position is limited by the chain 26'. The length of the arm 24' and the position of the attachment point 27' of the chain are so selected that the plow bottom 16' hangs approximately at the right spot and in the right attitude, while the plow bottom 16 is in operation. When at the end of the furrow 29 the driving direction of the plow is reversed, and the plow bottom 16' then moves downward, the same will come into contact with the soil approximately at the place of the next furrow to be plowed.

As soon as the plow begins to move to the left in FIGURE 1, the plow will deviate to the right until the guide wheel 10 abuts the straight flank of the furrow 29, and the abutment 11 rests on the arm 9. This position is illustrated in FIGURE 2. Owing to the position of the plow bottom 16' being determined by the chain 26' during the adjustment of the plow in the lateral direction owing to the plowing reaction this bottom will always perform an oppositely directed adjustment with respect to the plow so that at the same time already an almost straight furrow is plowed, in spite of the curve described by the plow itself. The free adjustability of the plow bottom 16' relative to the beam 12' remains for the time being preserved, since the plow gradually sinks deeper into the soil, and only at the last moment, when the plow bottom 16' has nearly reached the full depth, the disc 23' comes likewise into contact with the soil. At this moment this disc 23' will accordingly take over the steering, and when the disc 23' then did not yet stand exactly in the correct position, the disc 23' and accordingly also the plow bottom 16' seeks the right position.

Owing to the particular shape of the quadrilateral formed by the arm 24', the chain 26', part of the arm 15' and the rod 19' together with the end of the beam 12' a further progressively acting correction is made possible. When the end of the furrow 28 has a curvature, e.g. to the right in FIGURE 1, the plow as a whole will likewise tend to deviate to the right at the end of its path. Thereby the plow bottom 16 will under the control of the disc 23 likewise describe a curvature, however a flattened one. Thereby the beam 12' will swing out even wider towards the opposite side. The swing would not be sufficient for correcting the start of the new furrow. By the aforesaid quadrilateral however upon the additional swing of the beam 12', the chain 26' will allow an additional adjustment of the arm 15' relative to the beam 12', whereby an additional correction is effected as soon as the plow bottom 16' reaches the soil.

Advantageously a resilient element 26a may be inserted into the chain 26', which becomes effective then only when larger forces arise in the chain than those occurring in the chain owing to the bias of spring 18b in the valve- or slide-device 18'. Thereby it is attained that the effect described hereinabove can take place unhampered, while the chain will not break owing to the reactions occuring when the chain becomes taut or when the plow bottom 16' and the disc 23' come into contact with the soil.

What I claim is:

1. In an automatic bascule plow so constructed that it has the tendency of deviating from the furrow previously plowed and this deviation is counteracted by a wheel guided in the furrow finished last, and including a mobile chassis which at each of its forward and rear ends has one or more plow shares alternately in operation, a plow driving mechanism, and means for reversing the direction of driving the plow when reaching the end of a furrow, the improvements comprising a guide wheel lying in the direction of movement of the plow and freely movable in the vertical direction relative to the plow chassis for preventing displacement of the plow under said deviation tendency, each plow share at the forward and at the rear end of the plow being carried by an arm articulated to a plow beam pivotally mounted on the plow chassis, a servo-motor for adjusting the position of said arm relative to the beam, said servo-motor being actuated by a control device through a rod connected thereto, said rod at its free end being adjustably attached to a second beam extending in the longitudinal direction of the plow at a specific distance from said plow beam and pivotally mounted on the plow chassis, and said second beam at its free end being provided with a rotatably journalled vertical disc, whereby the plow share follows the lateral deflections of said disc.

2. In an automatic bascule plow the improvements according to claim 1, wherein the distance between the pivot points of the plow beam and the second beam on the plow chassis is smaller than the length of the rod between the control device and the free end of the second beam, and the rotatable disc is journalled on a pivot fixedly connected to the rod.

3. In an automatic bascule plow the improvements according to claim 2, wherein said pivot includes an angle with the center line of the rod.

4. In an automatic bascule plow the improvements according to claim 1, wherein the part of the plow beam lying between the chassis and the rod is shorter than the corresponding part of the second beam.

5. In an automatic bascule plow the improvements according to claim 1, wherein the plane of the disc at the normal rectilinear movement of the plow, and the plane of this disc, when the plow has performed a small angular deflection, intersect one another on a line lying at the level of the guide wheel lying at the other end of the plow.

6. In an automatic bascule plow the improvements according to claim 1, wherein said forward and rear plow shares are coupled together in pairs, the control device is under spring bias, so that when the rotatable disc lying higher than the plow share is clear of the soil, the servo-motor forces the arm with the plow share in the direction away from the disc, and that the arm is connected by means of a flexible element to the beam carrying the disc, said flexible element limiting the displacement of the arm in such a manner that, when one of the plow shares ceases plowing, the other coupled rear or forward plow share is freely suspended approximately above the furrow newly to be plowed with the plow share at such an inclined position with respect to the longitudinal axis of the plow chassis, that at the lateral displacement of the plow to the new path, said other share and the plow beam perform a corresponding lateral adjustment relative to the chassis in the opposite direction in such a way that the plow share comes accurately into the furrow to be plowed, the disc reaching the soil, when the plow share has arrived in the new position.

7. In an automatic bascule plow the improvements according to claim 6, wherein the end of said flexible element connected to the plow arm is connected at such a point to said second beam that depending on the non-operative plow beam being deflected by the furrow the chain permits the plow arm to adjust itself with respect to the plow beam further away from the direction of the disc.

8. In an automatic bascule plow the improvements according to claim 6, wherein said flexible element is a chain including a resilient element inserted therein which is capable of exerting a spring bias exceeding the force occurring in the chain owing to spring bias acting on said control device.

9. In an automatic bascule plow including a mobile chassis which at each of its forward and rear ends has at least one plow share alternately in operation, a plow driving mechanism, and means for reversing the direction of driving the plow, the improvements comprising each plow share at the forward and at the rear end of the plow being carried by an arm articulated for lateral movement to a longitudinal plow beam pivotally mounted for lateral movement on the plow chassis, a servo-motor for laterally adjusting the position of said arm relative to the beam, said servo-motor being actuated by a control device through a rod connected thereto, said rod at its free end being adjustably attached to a second longitudinal beam spaced from said plow beam, said second beam also being pivotally mounted for lateral movement on the plow chassis, and said second beam at its free end being provided with a rotatably journalled vertical disc, whereby the plow share follows the lateral deflections of said disc.

10. In a plow including a mobile chassis and a driving mechanism, the combination comprising a plow share at one end of the plow carried by a longitudinal arm articulated for lateral movement to a longitudinal plow beam pivotally mounted for lateral movement on the plow chassis, a servo-motor for adjusting the position of said arm relative to the beam, said servo-motor being actuated by a control device through a rod connected thereto, said rod at its free end being adjustably attached to a second longitudinal beam spaced from said plow beam, said second beam being also pivotally mounted for lateral movement on the plow chassis, and said second beam at its free end being provided with a rotatably journalled vertical disc, whereby the plow share follows the lateral deflections of said disc.

11. A mounting for a plow share adapted to dig a furrow and follow lateral deflections of a rotating vertical guide disc in spite of obstruction and changes in resistance to digging encountered in the earth, comprising a plow chassis, a pair of longitudinal beams each pivotally attached at one end to said chassis for lateral movements, a vertical guide disc rotatably mounted on the free end of one of said beams, a plow share carried by a member articulated to the free end of said other beam for lateral movement, a servo-motor connected to said other beam and said member for adjusting their relative positions, a control device for actuating said servo-motor, and means operated by lateral movements of said guide disc to regulate said control device to move the plow share in a direction opposing change of the lateral spacing between the disc and the plow share.

References Cited in the file of this patent

UNITED STATES PATENTS

| | | |
|---|---|---|
| 1,291,969 | McFarland | Jan. 21, 1919 |
| 1,403,101 | Pelling | Jan. 10, 1922 |
| 1,601,944 | Davidson | Oct. 5, 1926 |
| 1,743,961 | Ford | Jan. 14, 1930 |
| 1,855,965 | Hildebrand | Apr. 26, 1932 |